Nov. 2, 1954   W. T. HUNT, JR   2,693,563
ELECTRICAL MOTOR CONTROL SYSTEM
Filed June 18, 1952                                                     2 Sheets-Sheet 2

WITNESSES:

INVENTOR
William T. Hunt, Jr.
BY
ATTORNEY

United States Patent Office 2,693,563
Patented Nov. 2, 1954

2,693,563

ELECTRICAL MOTOR CONTROL SYSTEM

William T. Hunt, Jr., Williamsville, N. Y., assignor to Westinghouse Electric Corporation, East Pittsburgh, Pa., a corporation of Pennsylvania Application June 18, 1952, Serial No. 294,150

19 Claims. (Cl. 318—308)

This invention relates generally to motor control systems, and more in particular to such systems wherein a motor is controlled by both speed and position error quantities.

Paper mill drives afford an example of a class of motor applications wherein motor control in dependence of motor speed and angular position is advantageous. Drives of this class usually require a fairly high degree of regulation to avoid breaking the paper web passing through the mill. In view of the fact that paper speed through such mills is usually high, it is frequently necessary to provide a regulator having a fairly high gain. However, this introduces stability problems which require careful consideration.

The application of motors in driving separate sections of a paper mill requires close control of the respective motors and at the same time requires a degree of flexibility in the control such that the speeds of the respective motors may be varied over a limited range to permit adjustment of the draw between the several sections so that the web tension between the sections may be adequately controlled.

Various types of controls have been applied in controlling motors in such drives. In general where quick response is required, electronic speed regulators have been applied, but electronic controls are not inherently rugged and therefore do not match other types, for example, a carbon pile regulator in respect of trouble-free operation.

It is therefore a general object of this invention to provide a motor control system which is relatively fast in responding to system variables and which requires a minimum of maintenance.

Another object of this invention is to provide a system of the class referred to having good steady-state accuracy together with fast response to system transients.

A further object of this invention is to provide a control of the type referred to in which the several components of the system are inherently sturdy and have a long, useful life.

Figure 1:
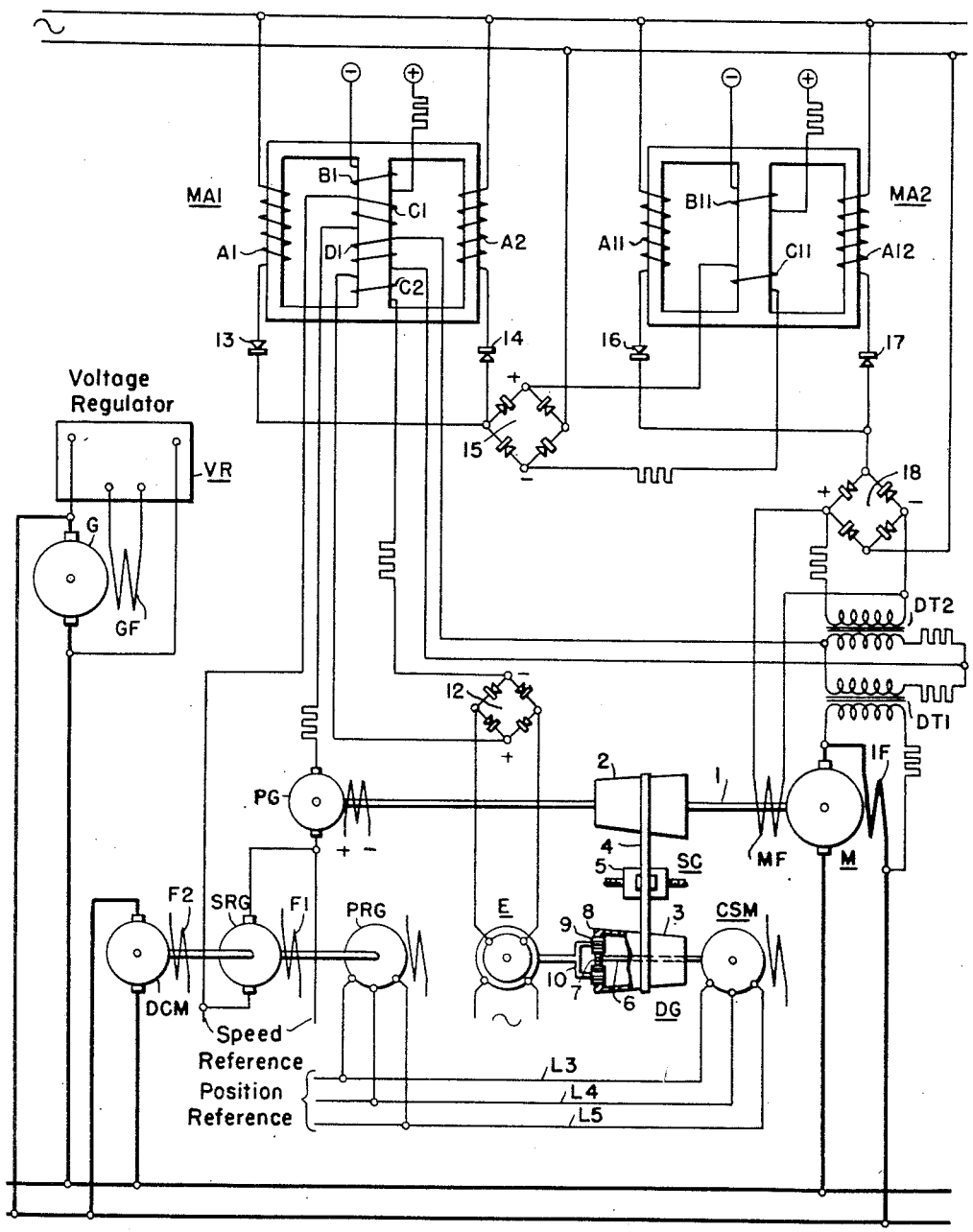
Figure 2:
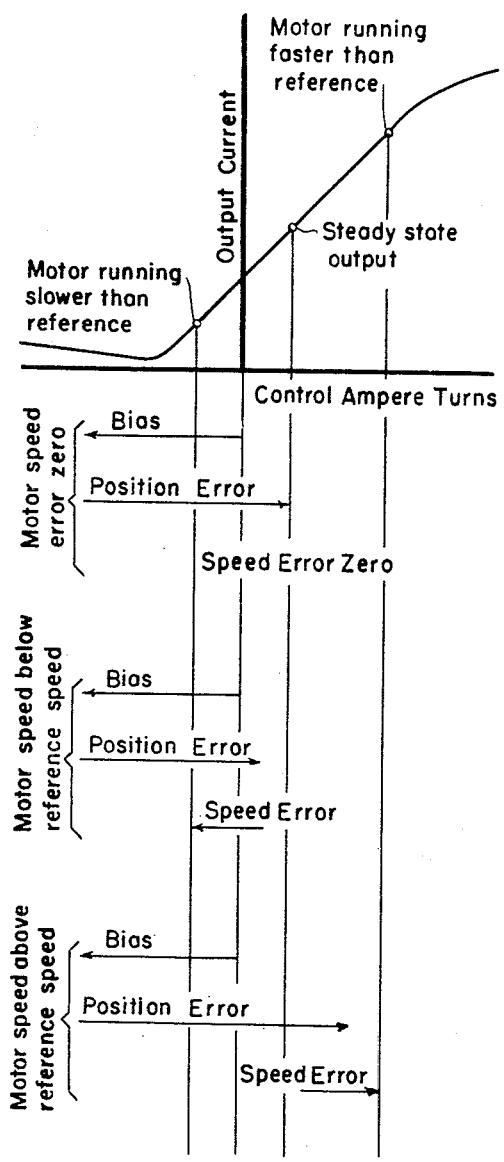
Figure 3:
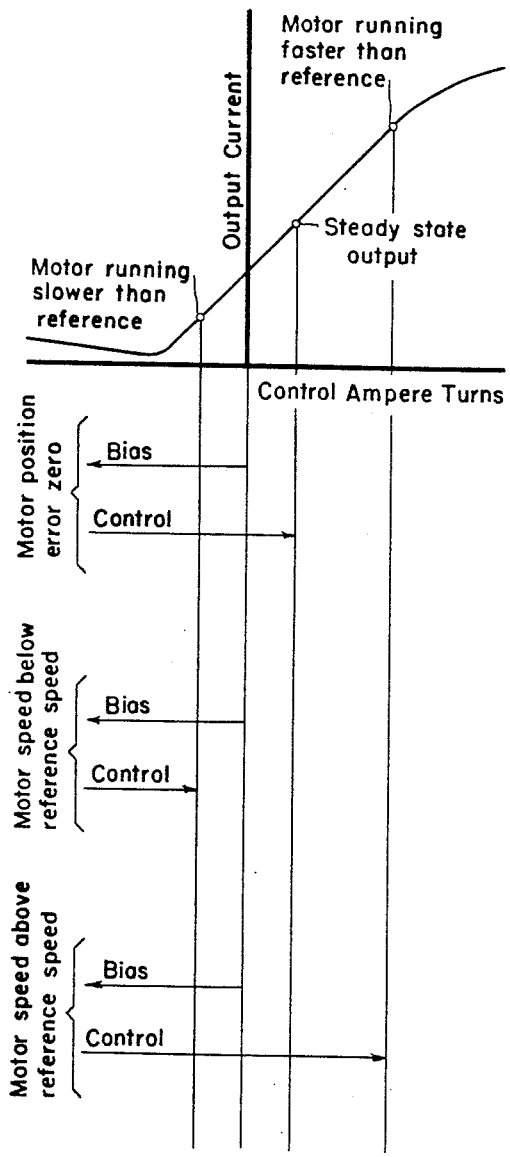

The foregoing statements are merely illustrative of the various aims and objects of this invention. Other objects and advantages will become apparent from a study of the following disclosure when considered in conjunction with the accompanying drawing, in which:

Fig. 1 diagrammatically illustrates a system of control for a motor embodying the principles of this invention, and Figs. 2 and 3 illustrate operating characteristics of respective amplifiers of the system.

The basic control principle involved in the illustrated system is that of controlling a motor such as M in dependence of an error in the speed of the motor with respect to a speed reference and in dependence of an error in angular position between a motor operated element and a position reference element. The system may be regarded essentially as a speed regulator in which a position error control is added to achieve a high degree of accuracy in controlling the instant angular position of the motor. As such, the function of the system is inherently that of a position regulator. However, the control is achieved in a speed regulating system which affords numerous control advantages, an important consideration being that a speed regulating system is more easily stabilized than a system which depends exclusively upon position error between a reference and a member to be controlled for producing the entire control quantity. This will be appreciated when it is noted that in a speed-regulating system the member or motor to be controlled is operated through the speed regulating control essentially at the speed of the reference member. Thus, the position error quantity need not be large, since its only function is to maintain positional agreement between two members operating substantially at the same base speeds.

In the system illustrated, the motor being controlled is a direct current motor designated M. The armature circuit of this motor is supplied from a main direct current bus which is energized by a main generator designated G. This generator is operated at some constant speed by a suitable motor, not shown. The output voltage of this generator is controlled by a shunt-connected field winding GF which is controlled by a suitable voltage regulator VR energizing the field circuit. Any particular type of constant direct current voltage source may be utilized in place of that herein illustrated. Motor M is provided with a separately excited field winding MF and in this instance, complete control of the motor is obtained through suitable excitation of this field. It will be appreciated at this point that other types of control for a motor such as M may be utilized. For example, motor M may form part of a Ward-Leonard system in which the speed of the motor is controlled through variation of motor armature terminal voltage, this variation in motor armature terminal voltage being obtained through suitable excitation control of the field winding of the generator. As a further alternative, a variation of this drive would be to operate the section motor such as M with a fixed field, utilizing a booster in series with the armature of motor M to control the speed of the motor. The booster generator in such an application is provided with a separately excited field winding which is controlled by the output of the regulator in a manner similar to the motor field MF.

The system employs differential regulator principles in deriving the error quantities for controlling the motor. A speed reference voltage is generated by a speed reference generator SRG. This generator is driven by a constant speed direct current motor DCM which is energized from the main DC bus, and is provided with a constantly excited field F2. The speed reference generator SRG is similarly provided with a constantly excited field F1. The shaft of motor M is connected to the input shaft 1 of a speed changer generally designated SC, comprising a pair of cone pulleys 2 and 3 interconnected by a belt 4 which is adjustably positioned axially of the cone pulleys by means of a belt shifter mechanism generally designated 5. This mechanism and its function will be described at a later point. In common with this connection of motor M in driving the speed changer, provision is made for mechanically driving a pilot generator PG by motor M. Pilot generator PG is any one of the conventional types of direct current generators having an output voltage which is a linear function of the speed of rotation of the generator. Such generators are usually provided either with a permanent magnet field or with a separate field winding adapted for constant excitation. This generator is connected in series opposition in a loop circuit including the armature of speed reference generator SRG, which circuit further includes a control winding C1 of a magnetic amplifier MA1. Thus, the voltage which appears across control winding C1 is the differential of the voltages of the speed reference generator and the pilot generator. The polarity of this voltage depends upon which of the generated voltages is the greater, and its variation is a function of the speed error of motor M.

The angular position reference for the system is established in a three-phase circuit supplied with alternating current voltage by an alternating current position reference generator PRG. As illustrated, this alternating current generator may be mechanically connected to and driven by the direct current motor DCM. The frequency of the alternating current in the position reference voltage conductors, designated L3, L4 and L5, is constant. This reference alternating current voltage is applied to a constant speed alternating current motor designated CSM. Such a motor, for example, may be a conventional small synchronous motor. The speed of this motor is therefore synchronized with the frequency of the position reference supply.

The output of constant speed motor CSM is utilized to drive one input shaft 6 of a mechanical differential, generally designated DG, which is located in one end of cone pulley 3, which cone pulley represents the other input connection of the mechanical differential. The specific arrangement of speed changer and mechanical differential herein illustrated appears in a copending application of W. Schaelchlin and C. E. Gary, Serial No. 294,149, filed on the same date as this application, entitled "Control Apparatus" and assigned to the assignee of this invention.

Differential DG comprises a spur gear 7 which is secured to the end of the shaft 6. Shaft 6 is concentrically disposed of the cone pulley 3, and while not so illustrated, suitable bearing means are provided whereby cone pulley 3 is freely rotatable about the shaft 6. An internal ring gear 8 is located in the end of cone pulley 3 in a plane including the plane defined by spur gear 7, and a plurality of planet pinions 9 which are rotatably mounted in circumferentially spaced relation on a planet carrier 10 are disposed between and in mesh with spur gear 7 and internal ring gear 8. Thus, when cone pulley 3 and spur gear 7 are rotating in opposite directions at angular speeds such that the peripheral speeds at the gear teeth are the same, no rotary motion is applied to the planet carrier 10 and the planet carrier remains in a given angular position. This is the condition in which the speed of motor M is a proper function of the speed of the constant speed motor CSM. However, if at this instant the angular position of the planet carrier 10 does not correspond to a fixed reference angular position, the instant angular position of the motor, while its speed may be correct, is in error. Hence, the function of the planet carrier is that of indicating the actual angular position of the motor at any instant.

Means for detecting angular movement of the planet carrier 10 is represented in a position error detector generally designated E. The error detector illustrated is a suitable single-phase wound-rotor machine, the primary of which is adapted for excitation from a suitable supply of single-phase alternating current. In practice, the rotor of this machine, when shifted from a position in which the induction axis of the rotor is in quadrature with the main field of the primary, a voltage is induced, having a phase relationship with respect to the primary excitation depending upon the direction of rotation and having a magnitude depending upon the amount of angular displacement. The latter of these two characteristics of the induced rotor voltage is utilized in this control arrangement.

When the planet carrier occupies the given reference angular position, the rotor of the position error detector is positioned with respect to the field of the primary such that a voltage is induced therein. The rotor of the error detector is limited in movement over a range in which the induction axis is displaced between zero degrees and 60 degrees in one direction of rotation with respect to the main field. Thus, the voltage induced in the rotor over this range varies from zero to .866 of the maximum possible induced rotor voltage, and when the planet carrier is in its given angular reference position, the induced rotor voltage, for example, will be 50% of the voltage induced at 60 degrees displacement of the rotor. The rotor voltage is rectified in a full-wave bridge type of rectifier, generally designated 12, the output of which is applied across a second control winding C2 of magnetic amplifier MA1.

Magnetic amplifier MA1 is provided with a pair of main windings A1 and A2, respectively connected in series with half-wave rectifiers 13 and 14 in parallel circuit branches arranged in a series loop across a suitable supply of single-phase alternating current. A rectifier 15 of the full-wave bridge type has its input terminals connected in this series loop. This magnetic amplifier is biased to cut off. As shown in Fig. 2 in the steady state, the control windings will overcome the bias of winding B1 and the operating point will be at the midpoint of its operating characteristic. Depending upon the control afforded by the respective control windings C1 and C2, this output voltage will be increased or decreased to provide the required control. The control characteristic of Fig. 2 as well as that of Fig. 3 is only qualitative and is not intended to accurately indicate relative magnitudes of control. As will be seen from Fig. 2, under steady state conditions, the speed error is zero. When the motor speed is too low the speed error voltage is one polarity and when the motor speed is high the polarity of the speed error voltage is of the opposite polarity.

The output of magnetic amplifier MA1 is utilized to control a second magnetic amplifier MA2, which is essentially a power amplifier. Amplifier MA2 is provided with a pair of main windings A11 and A12 respectively connected in series with half-wave rectifiers 16 and 17 in parallel circuit branches arranged in a series loop connected across a supply of alternating current. The input terminals of a full-wave bridge rectifier 18 are connected in this series loop. This amplifier is provided with a bias winding B11 energized with direct current which biases this amplifier to cut off. Field winding MF of the motor M is connected across the output terminals of full-wave rectifier 18.

The characteristics of amplifier MA2 appear in Fig. 3. Under steady state conditions corresponding to zero position error, the control ampere turns overcoming the bias ampere turns cause operation at about the midpoint of the operating characteristic. The change in amplifier output for decreasing and increasing control ampere turns, depending upon whether the motor speed is below or above reference speed appear in Fig. 3 in consecutive order beneath the steady state indication.

With the arrangement provided, it will be appreciated that when the system is started, an output voltage will appear across the output terminals of rectifier 18, exciting the motor field MF to cause motor M to rotate. Assuming, for example, that the main direct current bus is energized, and that the motor generator set powered by the direct current motor DCM is operated; the speed reference voltage and the position reference alternating current voltage will appear in the respective circuits. Since the motor M at this instant is not rotating, the output of the pilot generator PG is zero. As a consequence, the ampere turns of control winding C1 are due entirely to the excitation of the speed reference generator SRG. Since the constant speed motor CSM is operating, maximum position error in a lagging sense will be indicated, and similarly, the speed error indicated is that for a condition in which the motor is operating below the required speed. For this condition of operation, the ampere turns of control winding C1 are cumulative with respect to the bias winding B1 and the ampere turns of control winding C2, which act differentially with respect to the ampere turns of bias winding B1, are now zero. Thus, the output of magnetic amplifier MA2 is essentially at its minimum value, and as a consequence, the excitation of control winding C11 of magnetic amplifier MA2 is a minimum. Since the ampere turns of control winding C11 are differential with respect to those of bias winding B11, the impedance of the main winding circuit including winding A11 and A12 of this magnetic amplifier will be essentially at maximum value and the excitation of motor field MF will be low. As the motor accelerates and the voltage of the pilot generator builds up, the slow speed error signal decreases in magnitude. At the same time, the position error tends to decrease and the ampere turns of control winding C2 increase correspondingly. This effect gradually decreases the main winding impedance of magnetic amplifier MA1, and as a consequence, the output of power amplifier MA2 increases to strengthen the motor field. This operation continues until such time as the speed of the motor M and its angular position is such that the speed error voltage is zero and the output voltage of the error detector is that which exists when the planet carrier is in its given reference position. At this condition of equilibrium, control winding C1 is completely de-energized, since the pilot generator and speed reference generator voltages are balanced in the series loop. The control at this instant is therefore completely due to the ampere turns of control winding C2.

If at this time the speed of motor M should tend to increase beyond that of the constant speed motor CSM, the voltage of pilot generator PG will predominate that of the speed reference generator SRG. For this condition, the ampere turns of control winding C1 are reversed with respect to the previously considered situation and are now differential with respect to the ampere turns of bias winding B1. At the same time, the output of the error detector E increases. These combined ampere turns, now acting cumulatively, drive the magnetic amplifier MA1 to a higher degree of saturation, reducing the impedance of the main winding circuit and increasing the output. This condition is reflected through and amplified by magnetic amplifier MA2 and appears as increased excitation in the motor field MF, tending to decrease the motor speed so that equilibrium may be maintained. In a similar manner, when motor speed decreases below the required value, the ampere turns of control winding C1 reverse and the ampere turns of control winding C2 decrease, increasing the impedance of the output circuit of magnetic amplifier MA1, which condition is reflected in reduced excitation of motor field MF which tends to increase the speed of the motor to restore equilibrium.

Fast response to system transients requires a fairly high gain around the regulator loop through the two magnetic amplifiers. Although, as earlier mentioned, the primary regulation in this system is speed regulation, and a degree of anticipation of position error therefore exists, suitable damping circuits are required for adequate system stability. To this end, magnetic amplifier MA1 is provided with a damping winding D1 which is cumulatively related to bias winding B1. This damping winding is controlled by the secondary windings of a pair of damping transformers DT1 and DT2, which secondary windings are respectively connected in parallel with the damping winding D1. The primary winding of damping transformer DT2 is connected across the output of magnetic amplifier MA2, and thus affords a control of the damping winding in dependence of the rate of change of output of magnetic amplifier MA2. Thus, the control provides ampere turns in the damping winding in dependence of the rate of change of output of magnetic amplifier MA2. The current limit function is introduced by the damping transformer DT1, the primary of which is connected across the interpole or commutating winding IF of motor M. Thus, an additional control of the damping winding D1 is achieved in dependence of the rate of change of motor armature current, which introduces a control tending to minimize excessive motor armature currents, such as may exist, for instance, during the accelerating cycle previously described.

It will be appreciated by an inspection of the system herein illustrated that by suitable selection of time constants around the regulator loop, that fast response to system transients is achievable in conjunction with relatively high system gain, which under the control of suitable damping circuits results in a fast-acting control of the motor, while at the same time exhibiting a minimum tendency to hunt. Additionally, elements are herein utilized, for example, magnetic amplifiers, rectifiers and error detectors which are inherently rugged, and which if operated within their respective capacities, have a long, useful life. None of the control components herein illustrated providing the speed error signal and the position error signal need be large with respect to system requirements, inasmuch as the system design is such as to require minimum power levels, both electrical and mechanical, of these respective devices. An example of this is had in the case of the constant speed motor CSM. A motor such as this develops torque as a function of angular displacement of the motor with respect to the field. Hence, this motor, if excessively loaded, does not accurately portray the required fixed reference condition with respect to position. Accordingly, while it is feasible to obtain a speed error voltage by driving a generator such as PG by the planet carrier 10, the extra load imposed upon the constant speed motor would introduce an inaccuracy in the position of the drive. It will be appreciated that any inaccuracies which a speed system would tolerate are corrected by the position sense, hence the accuracy of a drive such as this is that of the position regulator, and such inaccuracies cannot be tolerated. The torque of the error detector is relatively low, and consequently introduces only very light torque loading on the constant speed motor. Thus by connecting the pilot generator PG to the main motor M, and utilizing the differential of the pilot generator voltage and a constant voltage to obtain a speed error indication, the accuracy of the system is greatly improved.

The general arrangement herein illustrated lends itself to a straightforward setup procedure in the installation of one of these drives. During calibration of the system, the position feedback can be disconnected. The drive is then operated as a speed regulator. The gain of the speed regulator and the damping feedback controls through the damping transformers are adjusted to give a fast, stable response. The position feedback can then be connected and its gain increased, whereafter the drive is adjusted to give the desired performance.

Adjustment of draw between the respective sections is accomplished by moving the belt shifter carriage 5 in a direction paralleling the axis of rotation of respective cone pulleys 2 and 3. This varies the drive ratio therebetween, since the system operates in such a way as to maintain the angular position of the planet carrier 10 in its fixed reference position, it will be appreciated that such an adjustment will result in system operation such that the motor speed will be maintained at the adjusted level. Thus a convenient arrangement is provided for adjusting the draw of any given section. It is to be understood that the drives for the other sections of the machine correspond essentially to that herein illustrated, each having a constant speed motor such as CSM connected to the position reference circuit and each having a pilot generator such as PG, which is driven by the motor of that section.

Although but one embodiment of this invention has been herein illustrated, it will be appreciated that the principles hereof may be practiced in systems involving equivalent components and different organizations of such components. Consequently, it is intended that the foregoing disclosure and the showing made in the drawing shall be considered only as illustrative of the principles of this invention, and are not to be interpreted in a limiting sense.

I claim as my invention:

1. A motor control system comprising, means for producing a reference voltage, means for producing a voltage indicative of motor speed, circuit means differentially combining said voltages and producing a speed error voltage, a mechanical differential, having a pair of input shafts and an output shaft, a speed changing device adapted to be driven by said motor and being connected to one input shaft, means for driving the other input shaft at a given constant speed, an electrical position error detector connected to said output shaft for producing a position error voltage in dependence of departure of said output shaft from a given angular position, and amplifying means responsive to said speed error voltage and said position error voltage for controlling said motor.

2. A motor control system comprising, means for producing a reference voltage, means for producing a voltage indicative of motor speed, circuit means differentially combining said voltages and producing a speed error voltage, a mechanical differential, having a pair of input shafts and an output shaft, one input shaft being adapted for connection to said motor to be driven thereby, means for driving the other input shaft at a given constant speed, an electrical position error detector connected to said output shaft for producing a position error voltage in dependence of departure of said output shaft from a given angular position, and amplifying means responsive to said speed error voltage and said position error voltage for controlling said motor.

3. A motor control system comprising, means for producing a constant voltage, means associated with the motor for producing a voltage indicative of motor speed, a magnetic amplifier having a main winding circuit, a bias winding circuit and a pair of control windings, said bias winding circuit biasing said magnetic amplifier to the midpoint of its characteristic curve, circuit means differentially applying said constant voltage and said speed error voltage to one of said pair of control windings, a constant speed drive, mechanical differential means responsive to the speed of said constant speed drive and the speed of said motor, an electrical position error detector driven by the output of said mechanical differential means, circuit means connecting the other of said pair of control windings to said position error detector, said main winding circuit being adapted for connection to said motor.

4. A motor control system comprising, means for producing a constant voltage, means associated with the motor for producing a voltage indicative of motor speed, a magnetic amplifier having a main winding circuit, a bias winding circuit and a pair of control windings, said bias winding circuit biasing said magnetic amplifier to the midpoint of its characteristic curve, circuit means differentially applying said constant voltage and said speed error voltage to one of said pair of control windings, a constant speed drive, mechanical differential means responsive to the speed of said constant speed drive and the speed of said motor, an electrical position error detector driven by the output of said mechanical differential means, circuit means connecting the other of said pair of control windings to said position error detector, and amplifying means connected with said main winding circuit for controlling said motor.

5. A motor control system comprising, means for producing a constant voltage, means associated with the motor for producing a voltage indicative of motor speed, a magnetic amplifier having a main winding circuit, a bias winding circuit and a pair of control windings, said bias winding circuit biasing said magnetic amplifier to the midpoint of its characteristic curve, circuit means differentially applying said constant voltage and said speed error voltage to one of said pair of control windings, a constant speed drive, mechanical differential means responsive to speed of said constant speed drive and the speed of said motor, an electrical position error detector driven by the output of said mechanical differential means, circuit means connecting the other of said pair of control windings to said position error detector, a second magnetic amplifier having a main winding circuit, a bias winding circuit and a control winding, said bias winding biasing said second magnetic amplifier to cut-off, circuit means connecting the control winding of the second magnetic amplifier to the main winding circuit of the first mentioned magnetic amplifier, and circuit means for applying the electrical output of the main winding circuit of the second magnetic amplifier to control said motor.

6. A motor control system comprising, circuit means for producing a reversible direct current speed error voltage indicative of departure of motor speed from a given speed, a variable speed drive connected to be driven by the motor to be controlled, a constant speed motor, a mechanical differential having a pair of input shafts and an output shaft, said input shafts being respectively connected to said constant speed motor and to the output of said variable speed drive, an electrical position error detector connected to the output shaft of said differential for producing a direct current position error voltage indicative of angular movement of the output shaft of the mechanical differential from a given angular position, a magnetic amplifier having a main winding circuit, a bias winding circuit and a pair of control windings, said bias winding circuit biasing said magnetic amplifier to the midpoint of its magnetic characteristic, circuit means for applying said speed error voltage to one control winding, circuit means applying said position error voltage to the other control winding, and circuit means responsive to the electrical output of said main winding circuit for controlling said motor.

7. A motor control system comprising, circuit means for producing a reversible direct current speed error voltage indicative of departure of motor speed from a given speed, a variable speed drive connected to be driven by the motor to be controlled, a constant speed motor, a mechanical differential having a pair of input shafts and an output shaft, said input shafts being respectively connected to said constant speed motor and to the output of said variable speed drive, an electrical position error detector connected to the output shaft of said differential for producing a direct current position error voltage indicative of angular movement of the output shaft of the mechanical differential from a given angular position, a magnetic amplifier having a main winding circuit, a bias winding circuit, a damping winding and a pair of control windings, circuit connections for applying said position error voltage to one control winding, circuit connections for applying said speed error voltage to the other control winding, circuit means responsive to the electrical output of said main winding circuit for producing a motor control electrical quantity, and circuit means responsive to the rate of change of said motor control electrical quantity for energizing said damping winding.

8. A motor control system comprising, circuit means for producing a reversible direct current speed error voltage indicative of departure of motor speed from a given speed, a variable speed drive connected to be driven by the motor to be controlled, a constant speed motor, a mechanical differential having a pair of input shafts and an output shaft, said input shafts being respectively connected to said constant speed motor and to the output of said variable speed drive, an electrical position error detector connected to the output shaft of said mechanical differential for producing a direct current position error voltage indicative of angular movement of the output shaft of the differential from a given angular position, a magnetic amplifier having a main winding circuit, a bias winding circuit, a damping winding and a pair of control windings, circuit connections for applying said position error voltage to one control winding, circuit connections for applying said speed error voltage to the other control winding, a second magnetic amplifier having a main winding circuit, a bias winding circuit and a control winding, said bias winding circuit of said second magnetic amplifier biasing said second magnetic amplifier to cut-off, said control winding of said second magnetic amplifier being connected to the main winding circuit of said first mentioned magnetic amplifier, circuit means responsive to the rate of change of electrical output of the main winding circuit of said second magnetic amplifier for exciting said damping winding, and circuit means responsive to the electrical output of said main winding circuit of said second magnetic amplifier for controlling said motor.

9. A motor control system comprising, circuit means for producing a reversible direct current speed error voltage indicative of departure of motor speed from a given speed, a variable speed drive connected to be driven by the motor to be controlled, a constant speed motor, a mechanical differential having a pair of input shafts and an output shaft, said input shafts being respectively connected to said constant speed motor and to the output of said variable speed drive, an electrical position error detector connected to the output shaft of said differential for producing a direct current position error voltage indicative of angular movement of the output shaft of the mechanical differential from a given angular position, a magnetic amplifier having a main winding circuit, a bias winding circuit, a damping winding and a pair of control windings, circuit connections for applying said position error voltage to one control winding, circuit connections for applying said speed error voltage to the other control winding, a second magnetic amplifier having a main winding circuit, a bias winding circuit and a control winding, said bias winding circuit of said second magnetic amplifier biasing said second magnetic amplifier to cut-off, said control winding of said second magnetic amplifier being connected to the main winding circuit of said first mentioned magnetic amplifier, circuit means responsive to the rate of change of electrical output of the main winding circuit of said second magnetic amplifier for exciting said damping winding, circuit means responsive to the rate of change of current of said motor for additionally exciting said damping winding, and circuit means responsive to the electrical output of said main winding circuit of said second magnetic amplifier for controlling said motor.

10. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by the output shaft of said mechanical differential, a tachometer generator connected to and driven by said direct current motor, a speed reference generator, a magnetic amplifier having an output circuit and a pair of control windings, circuit means connecting said output circuit of said magnetic amplifier to said field winding of said motor, circuit means differentially connecting said tachometer generator and said speed reference generator in a circuit with one of said control windings of said magnetic amplifier, and circuit means connecting said position error detector to the other control winding of said magnetic amplifier.

11. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by the output shaft of said mechanical differential, a tachometer generator connected to and driven by said direct current motor, a speed reference generator, a magnetic amplifier having an output circuit and a pair of control windings, a second magnetic amplifier having an output circuit connected to said field winding of said motor and having a control winding connected to the output circuit of said first named magnetic amplifier, circuit means differentially connecting said tachometer generator and said speed reference generator in a circuit with one of said control windings of said first named magnetic amplifier, and circuit means connecting said position error detector to the other of said control windings of said first named magnetic amplifier.

12. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; circuit means connecting said output circuit of said magnetic amplifier to said field winding of said motor, circuit means differentially connecting said tachometer generator and said speed reference generator in a circuit with said control winding means, circuit means connecting said position error detector to said control winding means of said magnetic amplifier, and means energized in dependence of motor armature current and connected with said damping winding means of said magnetic amplifier for energizing said damping winding means.

13. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; circuit means connecting said output circuit of said magnetic amplifier to said field winding of said motor, circuit means differentially connecting said tachometer generator and said speed reference generator in a circuit with said control winding means, circuit means connecting said position error detector to said control winding means of said magnetic amplifier, means energized in dependence of motor armature current and connected with said damping winding means of said magnetic amplifier for energizing said damping winding means, and means energized in dependence of the electrical energization of said field winding for energizing said damping winding means.

14. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; circiut means connecting said output circuit of said magnetic amplifier to said field winding of said motor, circuit means differentially connecting said tachometer generator and said speed reference generator in a circuit with said control winding means, circuit means connecting said position error detector to said control winding means of said magnetic amplifier, and a transformer having a primary winding connected with said armature winding to be energized in dependence of armature current and having a secondary winding connected to said damping winding means.

15. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; circuit means connecting said output circuit of said magnetic amplifier to said field winding of said motor, circuit means differentially connecting said tachometer generator and said speed reference generator in a circiut with said control winding means, circuit means connecting said position error detector to said control winding means of said magnetic amplifier, a transformer having a primary winding connected with said armature winding to be energized in dependence of armature current and having a secondary winding connected to said damping winding means, and a second transformer having a primary winding energized in dependence of the electrical energization of said field winding and having a secondary winding connected to said damping winding means.

16. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; a second magnetic amplifier having an output circuit connected to said field winding of said motor and having a control winding connected to said output circuit of said first named magnetic amplifier, circuit means differentially connecting said tachometer generator and said speed reference generator in a circuit with said control winding means of said first named magnetic amplifier, circuit means connecting said position error detector to said control winding means of said first named magnetic amplifier, and means energized in dependence of motor armature current and connected with said damping winding means of said first named magnetic amplifier for energizing said damping winding means.

17. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; a second magnetic amplifier having an output circuit connected to said field winding of said motor and having a control winding connected to said output circuit of said first named magnetic amplifier, circuit means differentially connecting said tachometer generator and said speed reference generator in a circuit with said control winding means of said first named magnetic amplifier, circuit means connecting said position error detector to said control winding means of said first named magnetic amplifier, means energized in dependence of motor armature current and connected with said damping winding means of said first named magnetic amplifier for energizing said damping winding means, and means energized in dependence of the electrical output of said second magnetic amplifier for energizing said damping winding means of said first named magnetic amplifier.

18. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; a second magnetic amplifier having an output circuit connected to said field winding of said motor and having a control winding connected to said output circuit of said first named magnetic amplifier, circuit means differentially connecting said tachometer generator and said speed reference generator in a circuit with said control winding means of said first named magnetic amplifier, circuit means connecting said position error detector to said control winding means of said first named magnetic amplifier, and a transformer having a primary winding connected with said armature winding of said motor and having a secondary winding connected to said damping winding means of said first named magnetic amplifier.

19. A control for a direct current motor comprising, a direct current motor having an armature winding and a field winding, circuit connections for applying direct current to said armature winding, a mechanical differential having a pair of input connections and an output shaft, means connecting said direct current motor to one input connection of said mechanical differential, a constant speed drive connected to the other input connection of said mechanical differential, a position error detector connected to and driven by said output shaft of said mechanical differential, a speed reference generator, a magnetic amplifier having an output circuit, control winding means and damping winding means; a second magnetic amplifier having an output circuit connected to said field winding of said motor and having a control winding connected to said output circuit of said first named magnetic amplifier, circuit means differentially connecting said tachometer generator and said speed reference generator in a circuit with said control winding means of said first named magnetic amplifier, circuit means connecting said position error detector to said control winding means of said first named magnetic amplifier, a transformer having a primary winding connected with said armature winding of said motor and having a secondary winding connected to said damping winding means of said first named magnetic amplifier, and a second transformer having a primary winding connected to said output circuit of said second magnetic amplifier and having a secondary winding connected to said damping winding means of said first named magnetic amplifier.

No references cited.